(12) United States Patent
Raeymaeckers et al.

(10) Patent No.: US 8,875,498 B2
(45) Date of Patent: Nov. 4, 2014

(54) SYSTEM COMPRISING A PUMP, AN INJECTOR AND A REGULATOR, WITH CONTROL SIGNALS TO THE PUMP WHICH ARE BASED ON CALCULATED HOSE RIGIDITIES

(75) Inventors: Ottmar Raeymaeckers, Saltsjö-Boo (SE); Erik Geijer Lundin, Stockholm (SE); Anders Larsson, Tullinge (SE); Eva Geijer, legal representative, Stockholm (SE); Leif Lundin, legal representative, Stockholm (SE)

(73) Assignee: Scania CV AB (SE)

( * ) Notice: Subject to any disclaimer, the term of this patent is extended or adjusted under 35 U.S.C. 154(b) by 116 days.

(21) Appl. No.: 13/639,671

(22) PCT Filed: Apr. 1, 2011

(86) PCT No.: PCT/SE2011/050386

§ 371 (c)(1),
(2), (4) Date: Nov. 14, 2012

(87) PCT Pub. No.: WO2011/126433
PCT Pub. Date: Oct. 13, 2011

(65) Prior Publication Data
US 2013/0048096 A1 Feb. 28, 2013

(30) Foreign Application Priority Data

Apr. 8, 2010 (SE) ...................................... 1050341

(51) Int. Cl.
*F01N 3/00* (2006.01)
(Continued)

(52) U.S. Cl.
CPC ......... *F04B 49/08* (2013.01); *F01N 2900/1806* (2013.01); *Y02T 10/24* (2013.01);
(Continued)

(58) Field of Classification Search
USPC ............ 60/295, 303; 137/12, 565.11, 565.13; 417/18
See application file for complete search history.

(56) References Cited

U.S. PATENT DOCUMENTS 6,209,315 B1 * 4/2001 Weigl .............................. 60/274
6,378,501 B1 4/2002 Hisato et al.
(Continued)

FOREIGN PATENT DOCUMENTS

EP 0 725 212 A2 8/1996
EP 1 847 703 A1 10/2007
GB 2 454 348 5/2009

OTHER PUBLICATIONS

International Search Report dated Jul. 20, 2011 issued in corresponding international patent application No. PCT/SE2011/050386.

*Primary Examiner* — Audrey K Bradley
(74) *Attorney, Agent, or Firm* — Ostrolenk Faber LLP

(57) ABSTRACT

A pump system that includes a pump, an injector and a regulator with a calculation unit. The regulator controls the pump to pump a liquid through a hose to the injector which opens and closes in response to an injector control signal, the time for an opening and closing cycle being called injector cycle and designated $T_s$, and the injector's open period being designated $\gamma$. The injector has a pressure sensor to measure the pressure of the liquid in the injector and to deliver to the calculation unit a pressure sensor signal representing the pressure amplitude in the injector. The calculation unit calculates the hose's rigidity B as a function of measured pressured amplitudes A in the injector, the injector cycle $T_s$ and the injector's open period $\gamma$, and the regulator determines the basis of B the control signal to the pump.

10 Claims, 2 Drawing Sheets

(51) Int. Cl.
  *F01N 3/10*    (2006.01)
  *E03B 1/00*    (2006.01)
  *F17D 1/00*    (2006.01)
  *F17D 3/00*    (2006.01)
  *E03B 5/00*    (2006.01)
  *F04B 49/00*   (2006.01)
  *F16K 21/00*   (2006.01)
  *F04B 49/08*   (2006.01)
  *F01N 3/20*    (2006.01)

(52) U.S. Cl.
  CPC .. *F01N 2900/1821* (2013.01); *F01N 2610/144* (2013.01); *F01N 2900/1808* (2013.01); *F04B 2205/05* (2013.01); *F01N 2610/02* (2013.01); *F01N 3/208* (2013.01)
  USPC ............ 60/295; 60/303; 137/12; 137/565.11; 137/565.13

(56) References Cited

U.S. PATENT DOCUMENTS

2008/0178580 A1    7/2008  Zapf et al.
2008/0276601 A1*  11/2008  Katou et al. .................... 60/287

* cited by examiner

2

SYSTEM COMPRISING A PUMP, AN INJECTOR AND A REGULATOR, WITH CONTROL SIGNALS TO THE PUMP WHICH ARE BASED ON CALCULATED HOSE RIGIDITIES

CROSS-REFERENCE TO RELATED APPLICATIONS

The present application is a 35 U.S.C. §§371 national phase conversion of PCT/SE2011/050386, filed Apr. 1, 2011, which claims priority of Swedish Application No. 1050341-5, filed Apr. 8, 2010, the contents of which are incorporated herein by reference. The PCT International Application was published in the English language.

FIELD OF THE INVENTION

The present invention relates to a pump system, and a method pertaining to a pump system. More specifically, a system and a method are indicated for automatically identifying the rigidity of a pressure hose.

The invention is described below on the basis of examples related to the vehicle industry, e.g. an SCR system and a fuel injection system, but is generally usable also for other applications pertaining to pressure regulation.

BACKGROUND TO THE INVENTION

So-called SCR (selective catalytic reduction) systems are used for reducing nitrogen oxides (NOx) from the exhaust gases of a diesel engine. Nitrogen oxides are thus converted, by means of a catalyst, to nitrogen gas ($N_2$) and water. A gas reductant, e.g. anhydrous ammonia, water-dissolved ammonia or urea, e.g. AdBlue, is added to a flow of flue gases or exhaust gases and is absorbed by a catalyst. Carbon dioxide is a reaction product when urea is used as reductant.

Using the SCR system involves injecting, for example, AdBlue at high pressure into the flue gases by means of an injector. A regulator is used to regulate the pressure in a high-pressure hose connected to the injector. The system regulated comprises a pump, hoses and an injector with a pressure sensor. The amount of gas reductant (AdBlue) added depends inter alia on measured contents of nitrogen oxides, preferably measured downstream from where the injector is situated. The gas reductant is added by opening and closing the injector, the amount of gas reductant being controlled by the open time for the injector. A typical cycle time for the injector, i.e. the period between two consecutive openings of the injector, is preferably of the order of 0.5 to 1.0 second.

The regulating parameters of the regulator depend inter alia on the characteristics of the high-pressure hose, such as its length and diameter and the softness of its material, e.g. rubber. The regulating parameters are also affected by temperature.

There are thus several characteristics which interact here and are covered, from a regulating perspective, by the concept of hose rigidity. A difficulty is that the hose rigidity is unknown, e.g. at the time of installation, and therefore needs somehow to be determined. One way of doing this is to manually calibrate the rigidity of every type of hose which might be relevant to the respective installation. However, this is very time-consuming and involves problems, e.g. if hoses have to be changed.

The object of the present invention is to simplify and improve the determination of hose rigidity so as not only to lead to less expensive handling but also afford advantages pertaining to hose changing in that no separate calibration need be done for each fresh hose.

SUMMARY OF THE INVENTION

According to the present invention, the hose rigidity B is calculated and is thereafter used for calculating appropriate regulating parameters for the pressure regulator, e.g. pressure. The regulator then calculates the control signal for the pump on the basis of these regulating parameters.

The advantage of the device according to the present invention is not having to manually calibrate the regulator with respect to the rigidity of the high-pressure hose. This eliminates a calibration operation during new production, changing of high-pressure hoses or restructuring of installations, and on the occasion of replacement of the control unit.

DETAILED DESCRIPTION OF PREFERRED EMBODIMENTS OF THE INVENTION

The invention is described below in detail with reference to the attached drawings.

Figure 1:
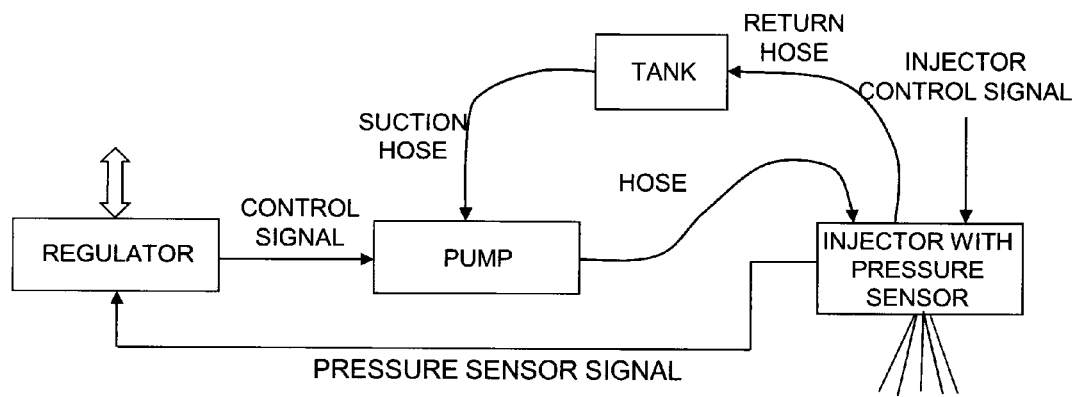
FIG. 1 is a schematic block diagram illustrating the present invention.

FIG. 1 is a schematic block diagram illustrating a pump system which comprises a pump, a tank, an injector with a pressure sensor and a pressure regulator with an undepicted calculation unit. The pump is connected to the injector by a high-pressure hose, hereinafter called "hose", to transfer liquid to the injectors.

Surplus liquid is returned to the tank via a return hose, and liquid which is to be pumped out passes from a tank to the pump via a suction hose. In the return hose, the liquid runs back to the tank, in which it is at approximately atmospheric pressure.

The regulator is adapted to control the pump by sending a control signal to the pump to pump liquid through the hose to the injector, which opens and closes in response to an injector control signal, and the time for an opening and closing cycle, called an injector cycle, is designated $T_S$ and the injector's open period is designated $\gamma$, where $0<\gamma<1$ and 0 denotes a situation in which the injector is closed for the whole injector cycle and 1 denotes a situation in which the injector is open for the whole injector cycle.

The injector is provided with a pressure sensor adapted to measure the pressure of the liquid in the injector and to deliver a pressure sensor signal to the calculation unit in the regulator, which calculation unit is adapted to determine on the basis of the pressure sensor signal the pressure amplitude A in the injector.

The calculation unit is further adapted to calculate the rigidity B of the hose as a function of the measured pressure amplitude A in the injector, the injector cycle $T_S$ and the injector's open period $\gamma$, and the regulator is adapted to determine on the basis of B the control signal to the pump.

The control signal then regulates the pressure of the liquid which is pumped out by the pump. This regulation may for example take place in such a way that if the hose has reached a rigidity value B which indicates that the hose is more rigid, this represents a higher pressure than if the hose rigidity indicates a less rigid hose. Moreover, a longer hose may require a higher pressure than a shorter hose. The hose lengths may vary greatly and may for example in the case of an SCR system be within the range of 1 to 25 meters. The double arrow to and from the regulator represents the connection to a superordinate system, e.g. an SCR system, which controls, and receives information from, the regulator. The injector control signal may be generated by the pressure regulator or by the superordinate system.

According to a preferred embodiment, the hose rigidity B is calculated by the equation $$B = \frac{1}{T_S} \frac{A}{(1-\gamma)\gamma},$$

where $0<\gamma<1$.

The hose rigidity B depends on one or more from among the length and diameter of the hose and its material, which may for example be rubber.

The pump system according to the present invention is particularly suited to use in an SCR system for a vehicle in which the liquid is for example anhydrous ammonia, water-dissolved ammonia or urea, e.g. AdBlue.

The regulator is adapted to control the pump with respect to the pressure in the liquid which is pumped out, and in particular in order to pump liquid at high pressure, the pressure of the liquid in the hose being for example of the order of 10 bar, i.e. 1 MPa.

The pump system according to the invention is preferably constantly activated, which means that the regulator continuously receives pressure sensor signals from the injector and can therefore automatically, i.e. in real time and continuously, adapt the pressure in the hose. The system thus accounts for changes in the hose rigidity B caused by, for example, changes in the temperature of the liquid. The pressure sensor signals are taken up at a sampling frequency which is related to the injector cycle. If the injector cycle is of the order of 1 second, the sampling frequency has to be at least 10 Hz, and preferably of the order of 100 Hz, to achieve sufficient accuracy.

The present invention relates also to a method in a pump system, comprising causing a pump to pump a liquid through a hose to an injector which is adapted to:
open and close with an open period designated $\gamma$ and a time for the whole opening and closing cycle which is designated $T_S$;
measuring the pressure of the liquid in the injector;
calculating the rigidity B of the hose as a function of measured pressure amplitudes A in the injector, the injector cycle $T_s$ and the injector's open period $\gamma$, and
determining on the basis of B the control signal to the pump.

The hose rigidity B is calculated by the equation $$B = \frac{1}{T_S} \frac{A}{(1-\gamma)\gamma},$$

where $0<\gamma<1$.

Figure 2:
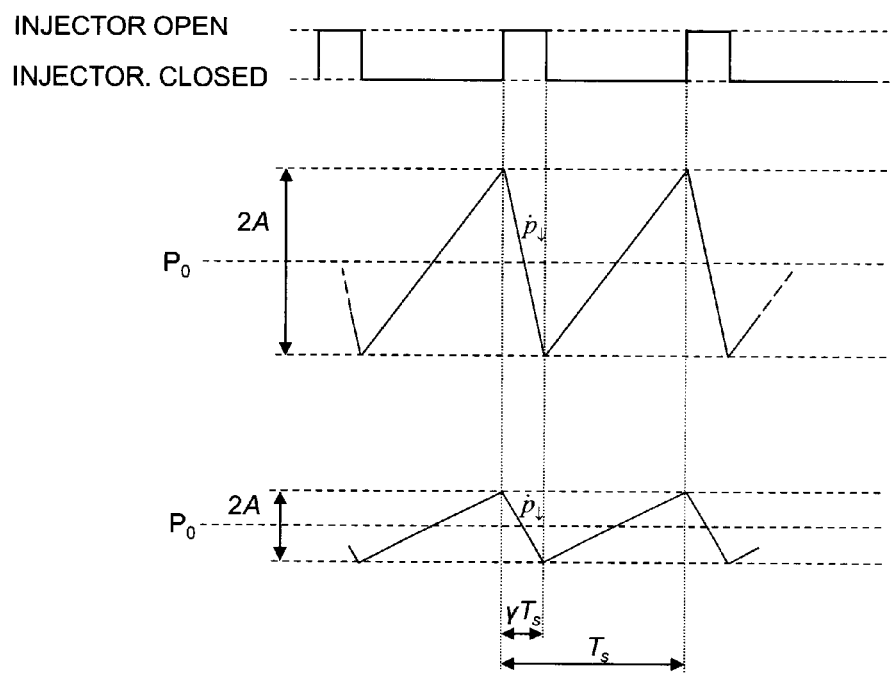
FIG. 2 comprises various graphs illustrating the present invention.
Figure 3:
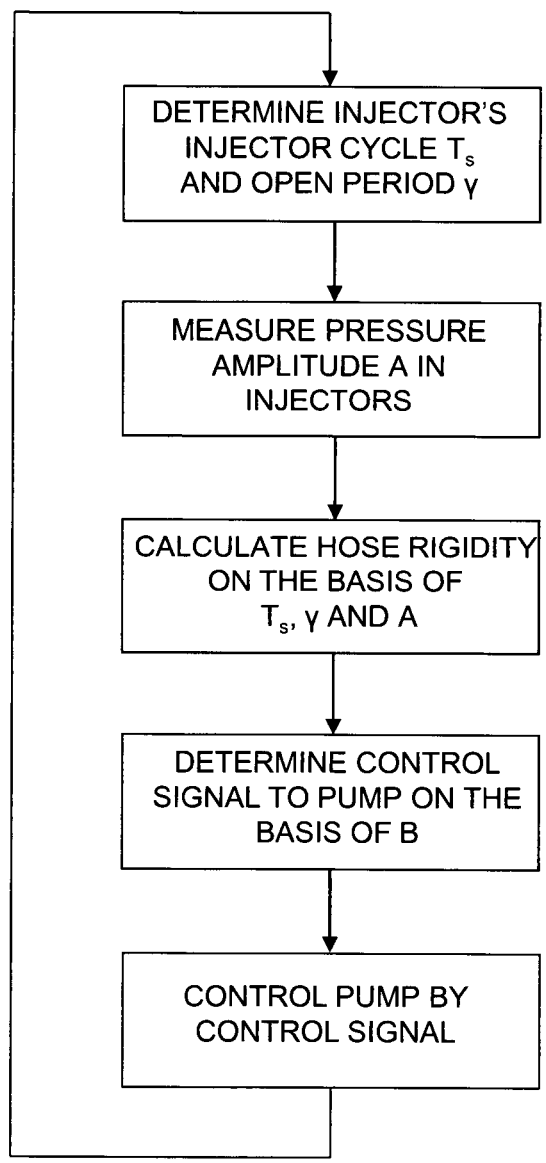
FIG. 3 is a flowchart illustrating the method according to the present invention.

When the system is in operation, the injector opens and closes in a controlled way. This results in pressure pulsations in the high-pressure hose which are measured by the pressure sensor in the injector. FIG. 2 is a schematic diagram of the possible form of such pressure pulsations, for a short hose (upper graph) and a long hose (lower graph). The top of the diagram represents the control signal to the injector. As may be seen in the diagram, the pressure drops when the injector is open and rises when the injector is closed. In the diagram, the injector is open for an equally long time for both hoses, but the pressure pulsations are clearly of different amplitudes. A long hose results in smaller amplitudes than a short hose of the same type. In the example depicted, $\gamma$ is approximately 0.25, i.e. the injector is open for a quarter of the injector cycle $T_s$.

It is thus possible to determine the rigidity of the hose by measuring the following two magnitudes:

The proportion of the opening/closing cycle $T_s$ for which the injector is open, which proportion is designated $\gamma$ and is therefore between 0 and 1.

The amplitude A of the pressure pulsations.

The first and second magnitudes are known and come from the superordinate system, the third magnitude is calculated in the calculation unit on the basis of the pressure signal. This takes place with a slight delay of the order of one opening/closing cycle $T_s$. The hose rigidity B (which may have the same dimensions as for pressure/time) can then be determined by the above equation.

The derivation of this equation starts from a physical relationship (a differential equation) which describes the pressure in the high-pressure hose. The physical relationship comprises the hose rigidity B and can be used to describe the slope of the pressure flanks. By equating the measured slope in FIG. 2 with the slope resulting from the physical relationship it is possible to determine B according to the above expression. A complete derivation of the equation for B appears at the end of the detailed description.

The hose rigidity B is then used to calculate appropriate regulating parameters in the regulator in FIG. 1. The hose rigidity is normally constant for a given hose, but may vary with, for example, temperature.

There follows below a derivation of the equation for the hose rigidity B which is used by the pump system according to the present invention.

To determine optimum regulator parameters for the pump regulator, it is necessary to know the system's time constant $\tau$. The time constant $\tau$ varies with the dosage $\gamma$. The $\tau$ values vary also across different types of hose. It is therefore appropriate to determine $\tau$ by means of system identification while the system is in operation. We describe below how a suitable value of r can be calculated during operation.

The pressure in the system is described by the differential equation $$\dot{p} = \frac{\beta}{V}\left[q(\chi) - C_q(a_{drain} + \gamma a_{dos})\sqrt{\frac{2p}{\rho}}\right] \quad \text{eq. 1}$$

in which $\beta$ and V respectively denote the hose's elasticity and volume, $q(\chi)$ the flow from the pump as a function of its control signal, and $$C_q(a_{drain} + \gamma a_{dos})\sqrt{\frac{2p}{\rho}}$$

the flow out from the high-pressure hose (via the return hose and the dosing valve).

Linearisation of equation 1 about $p=p_0$, produces $$\frac{V}{\beta}\frac{\sqrt{2\rho p_0}}{C_q(a_{drain}+\gamma a_{dos})}\dot{p}+p=q(\chi)\frac{\sqrt{2\rho p_0}}{C_q(a_{drain}+\gamma a_{dos})}-p_0 \qquad \text{eq. 2}$$

We also assume that the flow function $q(\chi)$ can be linearised about $\chi=\chi_0$ (where $\chi_0$ is the value of the control signal required to keep the pressure at $p=p_0$). The linearised flow function is $$q(\chi)=q(\chi_0)+\left.\frac{\partial q}{\partial \chi}\right|_{\chi_0}(\chi-\chi_0) \qquad \text{eq. 3}$$

in which $q(\chi_0)$ can be calculated by equation 1 and by assuming that equilibrium prevails, i.e. that the pressure is $p_0$:

$$q(\chi_0)=C_q(a_{drain}+\gamma a_{dos})\sqrt{\frac{2p_0}{\rho}} \qquad \text{eq. 4}$$

Inserting equation 4 in equation 3 produces $$q(\chi)=C_q(a_{drain}+\gamma a_{dos})\sqrt{\frac{2p_0}{\rho}}+\left.\frac{\partial q}{\partial \chi}\right|_{\chi_0}(\chi-\chi_0) \qquad \text{eq. 5}$$

Inserting equation 5 in equation 2 then produces $$\frac{V}{\beta}\frac{\sqrt{2\rho p_0}}{C_q(a_{drain}+\gamma a_{dos})}\dot{p}+p= \qquad \text{eq. 6}$$
$$\left(C_q(a_{drain}+\gamma a_{dos})\sqrt{\frac{2p_0}{\rho}}+\left.\frac{\partial q}{\partial \chi}\right|_{\chi_0}(\chi-\chi_0)\right)$$
$$\frac{\sqrt{2\rho p_0}}{C_q(a_{drain}+\gamma a_{dos})}-p_0$$

which may be simplified to $$\frac{V}{\beta}\frac{\sqrt{2\rho p_0}}{C_q(a_{drain}+\gamma a_{dos})}\dot{p}+(p-p_0)= \qquad \text{eq. 7}$$
$$\frac{\sqrt{2\rho p_0}}{C_q(a_{drain}+\gamma a_{dos})}\left.\frac{\partial q}{\partial \chi}\right|_{\chi_0}(\chi-\chi_0)$$

For the regulator we previously assumed that the pressure in the system behaves like the first-order differential equation $$\tau\dot{p}+(p-p_0)=k(\chi-\chi_0) \qquad \text{eq. 8}$$

With equations 7 and 8 it is now possible to identify the time constant $\tau$ as $$\tau=\frac{V}{\beta C_q}\frac{\sqrt{2\rho p_0}}{(a_{drain}+\gamma a_{dos})} \qquad \text{eq. 9}$$

The expression for $\tau$ contains some unknown constants which have to be determined. We can do this by looking at the "sawtooth pattern" superimposed in the pressure signal when the system doses, as illustrated in FIG. 2.

We assume that:
the dosage is kept constant (i.e. $\gamma$=const)
the system's mean pressure is $\tilde{p}=p_0$
the flow through the pump is almost constant during the cycle $T_s$ (i.e. $q(\chi)$=const).

On the above assumptions, $\dot{\tilde{p}}=0$, which makes it possible to approximate $q(\chi)$ to $$q(\chi)=C_q(a_{drain}+\gamma a_{dos})\sqrt{\frac{2p_0}{\rho}} \qquad \text{eq. 10}$$

We can express the derivative on the downward pressure flank of the sawtooth pattern as $$\dot{p}_\downarrow=\frac{\beta}{V}\left[q(\chi)-C_q(a_{drain}+a_{dos})\sqrt{\frac{2p}{\rho}}\right] \qquad \text{eq. 11a}$$

(i.e. equation 1 with gamma=1)

Inserting equation 10 in equation 11a then produces equation 11.

We can now approximate the derivative on the downward pressure flank of the sawtooth pattern to $$\dot{p}_\downarrow=\frac{\beta}{V}\left[C_q(a_{drain}+\gamma a_{dos})\sqrt{\frac{2p_0}{\rho}}-C_q(a_{drain}+a_{dos})\sqrt{\frac{2p_0}{\rho}}\right] \qquad \text{eq. 11}$$

which may be simplified to $$\dot{p}_\downarrow=-\frac{\beta}{V}C_q a_{dos}\sqrt{\frac{2p_0}{\rho}}(1-\gamma) \qquad \text{eq. 12}$$

We can also approximate $\dot{p}_\downarrow$ from FIG. 2 to $$\dot{p}_\downarrow=-\frac{2A}{\gamma T_s} \qquad \text{eq. 13}$$

If we equate equations 12 and 13, we arrive at the following relationship (after slight reorganisation):

$$A=\frac{\beta}{V}C_q a_{dos} T_s\sqrt{\frac{p_0}{2\rho}}(1-\gamma)\gamma \qquad \text{eq. 14}$$

For a given system this is an expression in the form $$A=BT_s(1-\gamma)\gamma, \qquad \text{eq. 15}$$

in which $$B=\frac{\beta}{V}C_q a_{dos}\sqrt{\frac{p_0}{2\rho}}=const \qquad \text{eq. 16}$$

The curve $A(\gamma)$ is a parabola with zero points $\gamma=0$ and $\gamma=1$, and maxima at the point $(\gamma, A)=(0.5, 0.25BT_s)$. Using instantaneous values of A, $\gamma$ and $T_s$ in the software makes it possible to determine the constant B from equation 15:

$$B = \frac{A}{T_s(1-\gamma)\gamma} \qquad \text{eq. 17}$$

The unit of measure for B is Pa/s. A conceivable description for B is "pressure rate constant" or, more simply, "hose constant".

When B has been determined, we can express the factor $$\frac{V}{\beta C_q}\sqrt{2\rho p_0}$$

in equation 9 (with the help of equation 16) as $$\frac{V}{\beta C_q}\sqrt{2\rho p_0} = a_{dos} p_0 \frac{1}{B} \qquad \text{eq. 18}$$

Insertion in equation 9 produces $$\tau = \frac{p_0}{B\left(\frac{a_{drain}}{a_{dos}} + \gamma\right)} \qquad \text{eq. 19}$$

Knowledge of the system's time constant $\tau$ is then usable in calculating the regulating parameters.

The present invention is not confined to the preferred embodiments described above. Sundry alternatives, modifications and equivalents may be used. The above embodiments are therefore not to be regarded as limiting the invention's scope of protection.

The invention claimed is:

1. A method of controlling a pump system, comprising:
based on a control signal sent to a pump, causing the pump to pump a liquid through a hose to an injector which is configured to open and close with an open period designated $\gamma$ and a time for a whole opening and closing cycle which is designated $T_S$;
measuring the pressure of the liquid in the injector;
calculating the rigidity B of the hose as a function of measured pressure amplitudes A in the injector, the injector cycle $T_S$, and the injector's open period $\gamma$, and determining on the basis of B the control signal to the pump.

2. A method according to claim 1, in which the hose rigidity B is calculated by the equation $$B = \frac{1}{T_s}\frac{A}{(1-\gamma)\gamma},$$

where $0<\gamma<1$.

3. A pump system, comprising:
a pump,
an injector,
a hose connecting the pump to the injector, and
an electronic pressure regulator,
which regulator is configured to control the pump by sending a control signal to the pump to cause the pump to pump a liquid through the hose to the injector which opens and closes in response to an injector control signal, the time for an opening and closing cycle being called an injector cycle and designated $T_S$, and the injector's open period being designated $\gamma$, the injector cycle $T_S$ and the injector's open period $\gamma$, being determined by the injector control signal,
the injector being provided with a pressure sensor configured to measure the pressure of the liquid in the injector and to deliver a pressure sensor signal to the regulator, which regulator is configured to calculate, on the basis of the pressure sensor signal, the pressure amplitude A in the injector and to calculate the hose's rigidity B on the basis of the calculated pressure amplitude A in the injector, the injector cycle $T_S$ and the injector's open period $\gamma$, the regulator being configured to determine, on the basis of the hose's rigidity B, the control signal sent to the pump.

4. A pump system according to claim 3, in which the hose rigidity B is calculated by the equation $$B = \frac{1}{T_s}\frac{A}{(1-\gamma)\gamma},$$

where $0<\gamma<1$.

5. A pump system according to claim 3, wherein said system is configured for a vehicle's SCR system.

6. A pump system according to claim 3, wherein said system is configured to pump liquid at high pressure.

7. A pump system according to claim 3, further comprising a return hose, a tank and a suction hose intended to return liquid to the pump.

8. A pump system according to claim 3, wherein the regulator is configured to control said pump with respect to the pressure of the liquid pumped out.

9. A pump system according to claim 3, wherein the hose rigidity B depends on at least one of: (1) the length of the hose, (2) the diameter of the hose, and (3) the material of the hose.

10. A pump system according to claim 3, wherein the liquid is urea.

* * * * *